United States Patent
Thapliya (10) Patent No.: US 9,866,490 B2
(45) Date of Patent: Jan. 9, 2018

(54) COMMUNICATION MANAGEMENT SYSTEM AND NON-TRANSITORY COMPUTER READABLE MEDIUM

(71) Applicant: FUJI XEROX CO., LTD., Tokyo (JP)

(72) Inventor: Roshan Thapliya, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 223 days.

(21) Appl. No.: 14/702,026

(22) Filed: May 1, 2015

(65) Prior Publication Data

US 2015/0237530 A1 Aug. 20, 2015

Related U.S. Application Data

(63) Continuation of application No. PCT/JP2013/071231, filed on Aug. 6, 2013.

(30) Foreign Application Priority Data

Jan. 10, 2013 (JP) ................................ 2013-002826

(51) Int. Cl.
*H04L 12/851* (2013.01)
*H04L 12/801* (2013.01)
(Continued)

(52) U.S. Cl.
CPC .......... *H04L 47/24* (2013.01); *H04L 12/2602* (2013.01); *H04L 47/225* (2013.01);
(Continued)

(58) Field of Classification Search
CPC ......... H04L 47/24; H04L 47/29; H04L 47/52; H04L 47/2408; H04L 12/2602;
(Continued)

(56) References Cited

U.S. PATENT DOCUMENTS 6,603,975 B1 8/2003 Inouchi et al.
6,657,993 B1 12/2003 Casanova et al.
(Continued)

FOREIGN PATENT DOCUMENTS

EP 1 018 830 A2 7/2000
JP 5-153154 A 6/1993
(Continued)

OTHER PUBLICATIONS

Communication dated Nov. 6, 2015, issued by the Australian Patent Office in counterpart Australian Patent Application No. 2013373349.

(Continued)

*Primary Examiner* — Kwang B Yao
*Assistant Examiner* — Moo Ryong Jeong
(74) *Attorney, Agent, or Firm* — Sughrue Mion, PLLC (57) ABSTRACT

A communication management system includes: a communication unit that respectively communicates with an information terminal belonging to one of a plurality of groups, via a communication channel assigned to the group to which the information terminal belongs, from among a plurality of communication channels; a control unit that controls a communication via the communication channel on the basis of a configuration value of bandwidth on the communication channel; and a bandwidth configuration unit that, for each communication channel, configures the configuration value of bandwidth on the communication channel, on the basis of data indicating time transitions of communication traffic volume of the group to which the communication channel is assigned.

14 Claims, 4 Drawing Sheets

(51) Int. Cl.
*H04L 12/873* (2013.01)
*H04L 12/815* (2013.01)
*H04L 12/923* (2013.01)
*H04W 28/10* (2009.01)
*H04L 12/26* (2006.01)

(52) U.S. Cl.
CPC ...... *H04L 47/2408* (2013.01); *H04L 47/2425* (2013.01); *H04L 47/29* (2013.01); *H04L 47/52* (2013.01); *H04L 47/762* (2013.01); *H04W 28/10* (2013.01)

(58) Field of Classification Search
CPC . H04L 47/2425; H04L 47/762; H04L 47/225; H04W 28/10
See application file for complete search history.

(56) References Cited

U.S. PATENT DOCUMENTS

| | | | |
|---|---|---|---|
| 2002/0150044 A1* | 10/2002 | Wu | H04L 47/15 370/229 |
| 2003/0043741 A1* | 3/2003 | Mukai | H04L 47/10 370/229 |
| 2005/0226249 A1* | 10/2005 | Moore | H04L 12/5601 370/395.21 |
| 2011/0314145 A1 | 12/2011 | Raleigh et al. | |
| 2012/0281557 A1 | 11/2012 | Carter et al. | |

FOREIGN PATENT DOCUMENTS

| | | |
|---|---|---|
| JP | 2000-32058 A | 1/2000 |
| JP | 2000-295276 A | 10/2000 |
| JP | 2000-358100 A | 12/2000 |
| JP | 2003-78561 A | 3/2003 |
| JP | 2005-522095 A | 7/2005 |
| WO | 2011149532 A1 | 12/2011 |

OTHER PUBLICATIONS

Written Opinion dated Nov. 12, 2013 issued by th International Searching Authority in International Application No. PCT/JP2013/071231 (PCT/ISA/237).
Int. Search Report dated Nov. 12, 2013 issued in Int. Application No. PCT/JP2013/071231 (PCT/ISA/210).
Written Opinion dated Nov. 12, 2013 issued in Int. Application No. PCT/JP2013/071231 (PCT/ISA/237).

* cited by examiner

| CLIENT ID | TRANSITION PATTERN | FEATURE VECTOR r<br>r = (Tmax, Bmax) |
|---|---|---|
| CLIENT A | TRANSITION PATTERN A | rA |
| CLIENT B | TRANSITION PATTERN B | rB |
| ⋮ | ⋮ | ⋮ |

| COMMUNICATION CHANNEL | CONFIGURATION VALUE |
|---|---|
| Ch1 | $BW_G$ |
| Ch2 | $BW_S$ |
| Ch3 | $BW_B$ |

$BW4 < BW_B \leq BW3 < BW_S \leq BW2 < BW_G \leq BW1$

COMMUNICATION MANAGEMENT SYSTEM AND NON-TRANSITORY COMPUTER READABLE MEDIUM

CROSS REFERENCE TO RELATED APPLICATION

This is a continuation of International Application No. PCT/JP2013/071231 filed on Aug. 6, 2013, and claims priority from Japanese Patent Application No. 2013-002826, filed on Jan. 10, 2013.

BACKGROUND

Technical Field

The present invention relates to a communication management system and a non-transitory computer readable medium.

SUMMARY

An aspect of the present invention provides a communication management system including: a communication unit that respectively communicates with an information terminal belonging to one of a plurality of groups, via a communication channel assigned to the group to which the information terminal belongs, from among a plurality of communication channels; a control unit that controls a communication via the communication channel on the basis of a configuration value of bandwidth on the communication channel; and a bandwidth configuration unit that, for each communication channel, configures the configuration value of bandwidth on the communication channel, on the basis of data indicating time transitions of communication traffic volume of the group to which the communication channel is assigned.

BRIEF DESCRIPTION OF THE DRAWINGS

Exemplary embodiment(s) of the present invention will be described in detail based on the following figures, wherein.

DETAILED DESCRIPTION

Figure 1:
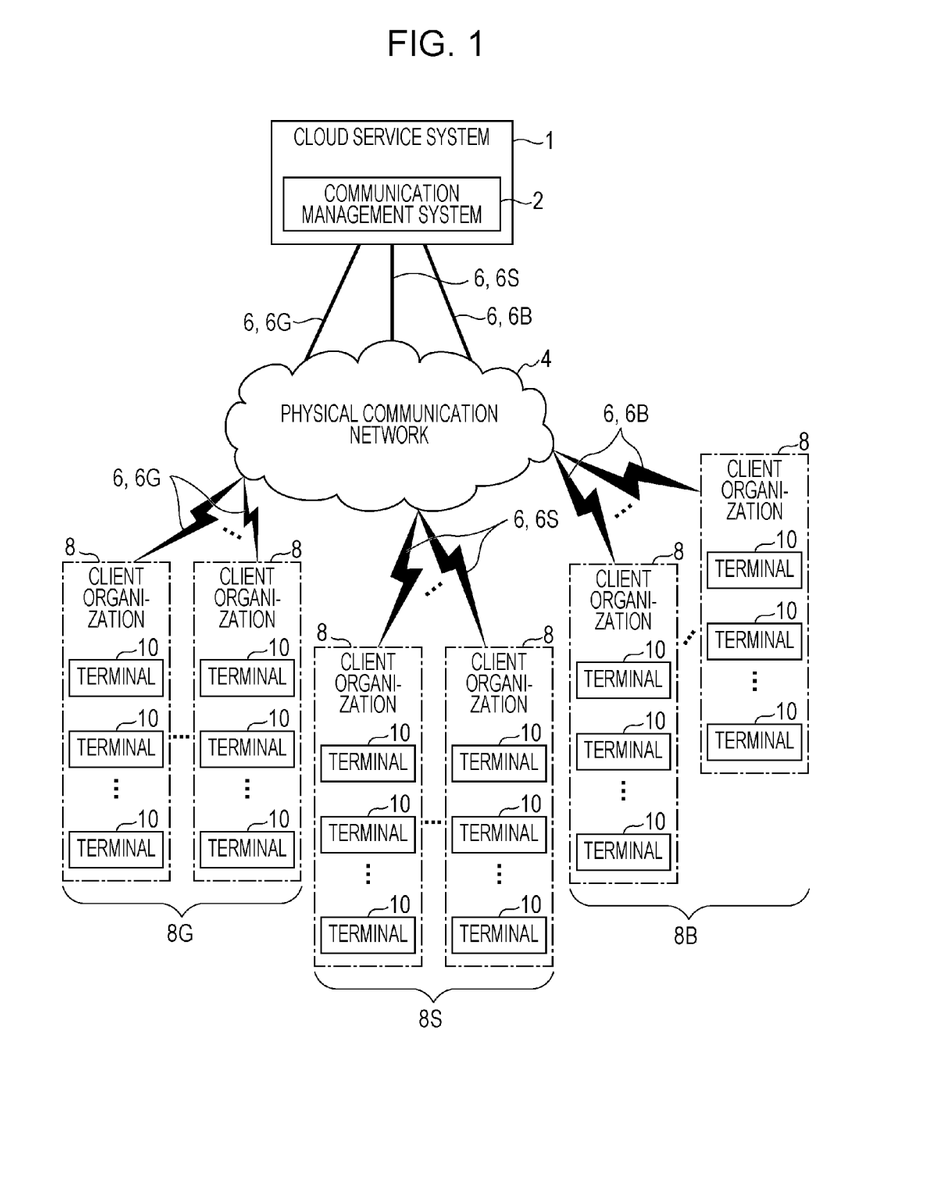
FIG. 1 is a diagram illustrating an example of a configuration of a communication management system.

As illustrated in FIG. 1, as an example, a communication management system 2 according to the present exemplary embodiment is applied to a cloud service system 1 that provides an information processing service to respective terminals (information terminals) 10 that belong to any of multiple groups. Herein, client organizations 8 correspond to "groups", in which one client organization 8 represents one "group". The communication management system 2 manages communication traffic as the cloud service system 1 provides the information processing service to each terminal 10. Herein, the cloud service system 1 is operated by a mobile virtual network operator (hereinafter abbreviated MVNO) that leases multiple communication channels 6 from a telecommunications carrier possessing a physical communication network 4, and is made up of one or multiple servers that provide an information processing service. For example, the cloud service system 1 may include servers such as a multimedia server that delivers multimedia content, a document management server, and a translation server.

Herein, suppose the MVNO leases three communication channels 6 (a communication channel 6G, a communication channel 6S, and a communication channel 6B), as illustrated in FIG. 1. The bandwidth of each communication channel 6 (that is, the communication capacity per unit time) has a variable configuration value, and as discussed later, the communication management system 2 manages the configuration value of each communication channel 6.

A communication channel 6 is assigned to each client organization 8 which is a client of the MVNO, depending on the class of the client organization 8. The cloud service system 1 communicates with each terminal 10 via the communication channel 6 assigned to the client organization 8 to which that terminal 10 belongs, and each client organization 8 uses the communication channel 6 assigned to itself to receive the provision of an information processing service. In the present exemplary embodiment, the communication channel 6G is assigned to a gold-class client organization 8G that has signed the most expensive contract with the MVNO. Communication with a terminal 10 belonging to the client organization 8G is conducted via the communication channel 6G. Also, the communication channel 6S is assigned to a silver-class client organization 8S that has signed the second most expensive contract with the MVNO. Communication with a terminal 10 belonging to the client organization 8S is conducted via the communication channel 6S. Also, the communication channel 6B is assigned to a bronze-class client organization 8B that has signed the least expensive contract with the MVNO. Communication with a terminal 10 belonging to the client organization 8B is conducted via the communication channel 6B.

Note that a client organization 8 is an organization that includes multiple individuals, such as a company or association. Also, although the following describes the terminal 10 as being a portable information terminal such as a smartphone, tablet PC, or mobile phone, the terminal 10 may also be a stationary information terminal such as a desktop PC. In addition, since the terminal 10 is a portable information terminal, the following describes the physical communication network 4 and the terminal 10 as having a wireless connection, but the physical communication network 4 and the terminal 10 may also have a wired connection.

The cloud service system 1 herein attempts to optimize the configuration value of the bandwidth of each communication channel 6 while ensuring the user quality of experience (QoE). This point is described below.

Note that in the following, the communication channel 6G may be designated "Ch1" in some cases. Also, the communication channel 6S may be designated "Ch2" in some cases. Also, the communication channel 6B may be designated "Ch3" in some cases.

Figure 2:
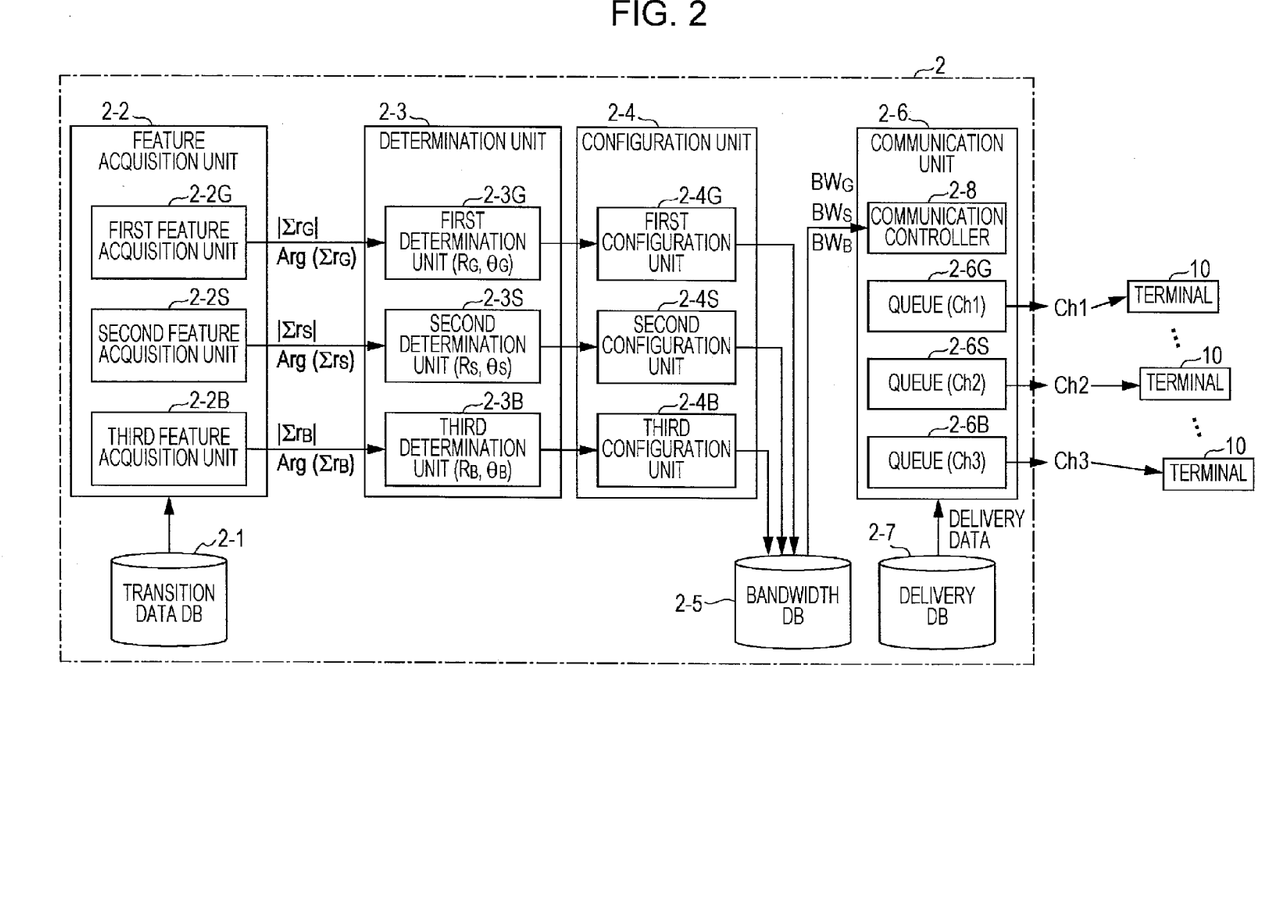
FIG. 2 is a diagram illustrating a subset of structural elements in a communication management system.

FIG. 2 is a diagram illustrating a subset of structural elements in the communication management system 2. In the present exemplary embodiment, each structural element is realized by one of the servers constituting the cloud service system 1.

[Transition Data DB]

As illustrated in FIG. 2, the communication management system 2 is equipped with a transition data database (hereinafter designated the transition data DB) 2-1. The transition data DB 2-1 stores transition data.

Figure 3:
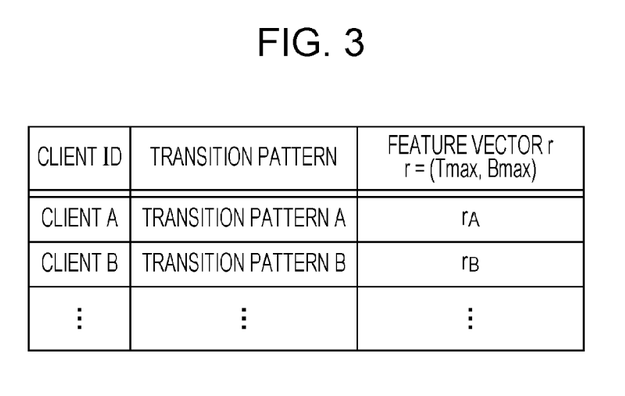
FIG. 3 is a diagram illustrating an example of transition data.

Transition data indicates time transitions in the communication traffic volume for each client organization 8 over a predetermined period. FIG. 3 is a diagram illustrating an example of transition data. In the present exemplary embodiment, the above predetermined period is "one day", and the transition data stores, in association with a client ID of each client organization 8, transition pattern data indicating time transitions in the communication traffic volume of that client organization 8 over one day, and a feature vector r indicating features related to the relevant time transitions. The transition pattern data is obtained by measuring the communication traffic volume of a client organization 8 over several days, and averaging the measured result for each day for individual time slots. The transition pattern data is updated as appropriate. The time transitions indicated by the transition pattern data are also called an action profile curve (APC).

Note that, although not illustrated in the drawings, the transition data also stores other information in association with the client ID of each client organization 8, such as an ID of the communication channel 6 assigned to that client organization, and a list of terminals 10 belonging to that client organization 8. For this reason, by referencing the transition data, it is possible to identify the communication channel 6 assigned to an individual client organization 8, and the client organization 8 to which an individual terminal 10 belongs.

Figure 4:
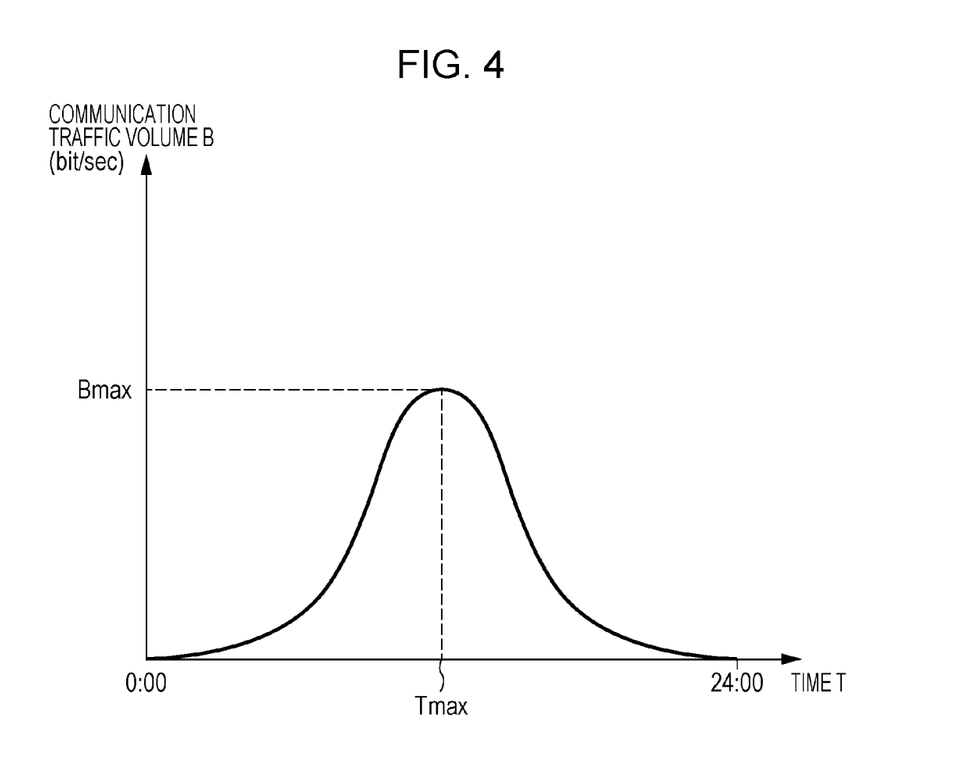
FIG. 4 is a diagram illustrating an example of a time transition.

FIG. 4 is a diagram illustrating an example of time transitions expressed by transition pattern data. The horizontal axis T indicates the elapsed time since 0:00 midnight, while the vertical axis B indicates the communication traffic volume. Since a certain number of people belong to a client organization 8, individual randomness is cancelled out, and the time transitions become a static pattern. Also, if a client organization 8 is of sufficiently large scale, the shape of the time transitions approaches a Gaussian distribution. Note that Tmax is the time T at which the communication traffic volume reaches a peak, while Bmax is the peak value of the communication traffic volume. The feature vector r is a vector whose components are Tmax and Bmax (see FIG. 3).

Ordinarily, time transitions reflect the characteristics of the business conducted by the client organization 8. For example, for a business that deals with customers concentrated in the evening, such as a bank, a peak appears in the evening. For this reason, the time transitions indicate a trend unique to the client organization.

[Feature Acquisition Unit]

Additionally, the communication management system 2 is equipped with a feature acquisition unit 2-2. The feature acquisition unit 2-2 reads out transition data from the transition data DB 2-1. For example, the feature acquisition unit 2-2 reads out transition data at a predetermined time (for example, at 0:00 midnight). Subsequently, on the basis of the read-out transition data, the feature acquisition unit 2-2 acquires, for each communication channel 6, features related to the communication traffic volume on that communication channel 6.

In the case of the present exemplary embodiment, the feature acquisition unit 2-2 includes a first feature acquisition unit 2-2G, a second feature acquisition unit 2-2S, and a third feature acquisition unit 2-2B. The first feature acquisition unit 2-2G, on the basis of the transition data, acquires features related to the communication traffic volume on the communication channel Ch1. Specifically, the first feature acquisition unit 2-2G computes the vector sum of a feature vector r associated with the client ID of the gold-class client organization 8G. Note that in FIG. 2, the feature vector r associated with the client ID of the client organization 8G is designated "$r_G$", and the vector sum is designated "$\Sigma r_G$".

Additionally, the first feature acquisition unit 2-2G computes the scalar quantity "$|\Sigma r_G|$" of the vector sum "$\Sigma r_G$" and the argument "$\text{Arg}(\Sigma r_G)$" of the vector sum "$\Sigma r_G$" as the features.

Also, the second feature acquisition unit 2-2S, on the basis of the transition data, acquires features related to the communication traffic volume on the communication channel Ch2. Specifically, the second feature acquisition unit 2-2S computes the vector sum of a feature vector r associated with the client ID of the silver-class client organization 8S. Note that in FIG. 2, the feature vector r associated with the client ID of the client organization 8S is designated "$r_S$", and the vector sum is designated "$\Sigma r_S$". Additionally, the second feature acquisition unit 2-2S computes the scalar quantity "$|\Sigma r_S|$" of the vector sum "$\Sigma r_S$" and the argument "$\text{Arg}(\Sigma r_S)$" of the vector sum "$\Sigma r_S$" as the features.

Also, the third feature acquisition unit 2-2B, on the basis of the transition data, acquires features related to the communication traffic volume on the communication channel Ch3. Specifically, the third feature acquisition unit 2-2B computes the vector sum of a feature vector r associated with the client ID of the bronze-class client organization 8B. Note that in FIG. 2, the feature vector r associated with the client ID of the client organization 8B is designated "$r_B$", and the vector sum is designated "$\Sigma r_B$". Additionally, the third feature acquisition unit 2-2B computes the scalar quantity "$|\Sigma r_B|$" of the vector sum "$\Sigma r_B$" and the argument "$\text{Arg}(\Sigma r_B)$" of the vector sum "$\Sigma r_B$" as the features.

[Determination Unit]

Additionally, the communication management system 2, is equipped with a determination unit 2-3. The determination unit 2-3 determines, for each communication channel 6, whether or not the features acquired by the feature acquisition unit 2-2 for that communication channel 6 satisfy a condition unique to that communication channel. In the present exemplary embodiment, the determination unit 2-3 includes a first determination unit 2-3G, a second determination unit 2-3S, and a third determination unit 2-3B.

The first determination unit 2-3G determines whether or not both the scalar quantity "$|\Sigma r_G|$" and the argument "$\text{Arg}(\Sigma r_G)$" satisfy a condition unique to the communication channel Ch1. Specifically, the first determination unit 2-3G determines whether or not the scalar quantity "$|\Sigma r_G|$" is less than or equal to an upper-limit scalar quantity $R_G$ unique to the communication channel Ch1, and also whether or not the argument "$\text{Arg}(\Sigma r_G)$" is less than or equal to an upper-limit argument $\theta_G$. In other words, the first determination unit 2-3G determines whether or not both of the following two inequalities hold true.

$|\Sigma r_G| \leq R_G$            Inequality (1)

$\text{Arg}(\Sigma r_G) \leq \theta_G$            Inequality (2)

Also, the second determination unit 2-3S determines whether or not both the scalar quantity "$|\Sigma r_S|$" and the argument "$\text{Arg}(\Sigma r_S)$" satisfy a condition unique to the communication channel Ch2. Specifically, the second determination unit 2-3S determines whether or not the scalar quantity "$|\Sigma r_S|$" is less than or equal to an upper-limit scalar quantity $R_S$ unique to the communication channel Ch2, and also whether or not the argument "$\mathrm{Arg}(\Sigma r_S)$" is less than or equal to an upper-limit argument $\theta_S$. In other words, the second determination unit 2-3S determines whether or not both of the following two inequalities hold true.

$$|\Sigma r_S| \leq R_S \quad \text{Inequality (3)}$$

$$\mathrm{Arg}(\Sigma r_S) \leq \theta_S \quad \text{Inequality (4)}$$

Also, the third determination unit 2-3B determines whether or not both the scalar quantity "$|\Sigma r_B|$" and the argument "$\mathrm{Arg}(\Sigma r_B)$" satisfy a condition unique to the communication channel Ch3. Specifically, the third determination unit 2-3B determines whether or not the scalar quantity "$|\Sigma r_B|$" is less than or equal to an upper-limit scalar quantity $R_B$ unique to the communication channel Ch3, and also whether or not the argument "$\mathrm{Arg}(\Sigma r_B)$" is less than or equal to an upper-limit argument $\theta_B$. In other words, the third determination unit 3-3B determines whether or not both of the following two inequalities hold true.

$$|\Sigma r_B| \leq R_B \quad \text{Inequality (5)}$$

$$\mathrm{Arg}(\Sigma r_B) \leq \theta_B \quad \text{Inequality (6)}$$

[Configuration Unit, Bandwidth Database]

Figure 5:
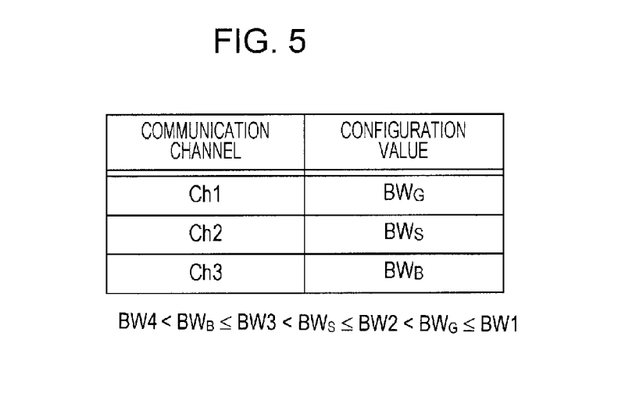
FIG. 5 is a diagram illustrating an example of stored content in a bandwidth database.

In addition, the communication management system 2 is equipped with a configuration unit 2-4 and a bandwidth database (hereinafter designated the bandwidth DB) 2-5. The bandwidth DB 2-5 stores, in association with each communication channel 6, a configuration value of the bandwidth on that communication channel 6. FIG. 5 illustrates an example of the stored content in the bandwidth DB 2-5. As illustrated in the figure, the bandwidth DB 2-5 stores, in association with an ID of each communication channel 6, a configuration value of the bandwidth on that communication channel 6. In other words, the bandwidth DB 2-5 stores a configuration value $BW_G$ of the bandwidth on the communication channel Ch1 in association with the ID of the communication channel Ch1, stores a configuration value $BW_S$ of the bandwidth on the communication channel Ch2 in association with the ID of the communication channel Ch2, and stores a configuration value $BW_B$ of the bandwidth on the communication channel Ch3 in association with the ID of the communication channel Ch3. Note that the configuration values $BW_G$, $BW_S$, and $BW_B$ are configured so that the inequality "$BW_G > BW_S > BW_B$" holds true. In other words, the configuration value $BW_G$ is configured to a value that is greater than a preset value BW2 but less than or equal to a preset value BW1, the configuration value $BW_S$ is configured to a value that is greater than a preset value BW3 but less than or equal to the preset value BW2, and the configuration value $BW_B$ is configured to a value that is greater than a preset value BW4 but less than or equal to the preset value BW3.

Hereinafter, the configuration values $BW_G$, $BW_S$, and $BW_B$ will be collectively designated BW in some cases.

In addition, the configuration unit 2-4 configures, for each communication channel 6, the configuration value BW of the bandwidth on that communication channel 6, on the basis of a determination result of the determination unit 2-3. In the present exemplary embodiment, the configuration unit 2-4 includes a first configuration unit 2-4G, a second configuration unit 2-4S, and a third configuration unit 2-4B.

The first configuration unit 2-4G configures the configuration value $BW_G$ on the basis of a determination result of the first determination unit 2-3G. Herein, the first configuration unit 2-4G configures the configuration value $BW_G$ to the above BW1 if the above Inequality (1) or Inequality (2) does not hold true, and configures the configuration value $BW_G$ to a value between the above BW2 and the above BW1 if Inequality (1) and Inequality (2) both hold true. Also, the second configuration unit 2-4S configures the configuration value $BW_S$ to the above BW2 if the above Inequality (3) or Inequality (4) does not hold true, and configures the configuration value $BW_S$ to a value between the above B3 and the above B2 if Inequality (3) and Inequality (4) both hold true. Also, the third configuration unit 2-4B configures the configuration value $BW_B$ to the above BW3 if the above Inequality (5) or Inequality (6) does not hold true, and configures the configuration value $BW_B$ to a value between the above BW4 and the above BW3 if Inequality (5) and Inequality (6) both hold true.

In this way, the configuration value BW of the bandwidth on each communication channel 6 is configured periodically. Since the configuration value BW of the bandwidth on each communication channel 6 is configured from features related to the communication traffic volume on each communication channel 6, the configuration values BW are optimized while ensuring the user quality of experience.

[Communication Unit, Delivery Database]

Note that the communication management system 2 is equipped with a communication unit 2-6 and a delivery database (hereinafter, delivery DB) 2-7.

The communication unit 2-6 communicates with each terminal 10 via the communication channel 6 assigned to the client organization 8 to which that terminal 10 belongs. In other words, the communication unit 2-6 provides an information processing service to each terminal 10 via the communication channel 6 assigned to the client organization 8 to which that terminal 10 belongs. Specifically, delivery data generated by the cloud service system 1 is plurally stored in the delivery DB 2-7. For each individual piece of delivery data, information such as the delivery destination terminal 10 and the delivery execution time are decided, and the communication unit 2-6 transmits, via one of the communication channels 6, delivery data whose delivery execution time has arrived.

More specifically, the communication unit 2-6 includes a Ch1 queue 2-6G, a Ch2 queue 2-6S, and a Ch3 queue 2-6B. These queues are buffers that hold data in a first-in, first-out format. When transmitting delivery data whose delivery execution time has arrived, the communication unit 2-6 splits the delivery data into a group of packets of a predetermined data size, and enqueues the packet group in the queue of the communication channel 6 assigned to the client organization 8 to which the delivery destination terminal 10 belongs. For example, if the client organization 8 to which the delivery destination terminal 10 belongs is the gold-class client organization 8G, the communication unit 2-6 enqueues the packet group in the Ch1 queue 2-6G. Delivery data inserted into the queue is sent to the corresponding communication channel 6 in a first-in, first-out order. In other words, delivery data enqueued in the Ch1 queue 2-6G is sent to Ch1, delivery data enqueued in the Ch2 queue 2-6S is sent to Ch2, and delivery data enqueued in the Ch3 queue 2-6B is sent to Ch3.

The role of the communication unit 2-6 is not limited to the above. When providing an information processing service to each terminal 10, the communication unit 2-6 controls the transmission of delivery data from each communication channel 6 on the basis of the configuration value BW of the bandwidth on that communication channel 6. In other words, the communication unit 2-6 controls the transmission of delivery data from the communication channel Ch1 on the basis of the configuration value $BW_G$, controls the transmission of delivery data from the communication channel Ch2 on the basis of the configuration value $BW_S$, and controls the transmission of delivery data from the communication channel Ch3 on the basis of the configuration value $BW_B$.

Specifically, the communication unit 2-6 includes a communication controller 2-8. The communication controller 2-8 monitors each queue, and conducts traffic shaping (also called packet shift) so that the data volume per unit time sent to each communication channel 6 does not exceed the configuration value BW of the bandwidth on that communication channel 6. Hereinafter, the Ch1 queue 2-6G will be used as an example to describe traffic shaping. With traffic shaping, all time slots in a queue are sequentially configured as the current time slot CT starting from the first time slot, and the following process is executed for the current time slot CT. Namely, the communication controller 2-8 determines whether or not the current time slot has free space. Specifically, the communication controller 2-8 computes the total data volume of all packets in the current time slot, and determines whether or not the total value is less than or equal to the configuration value $BW_G$ of the bandwidth on Ch1. Subsequently, if the total value exceeds the configuration value BWG, or in other words, if there is no free space in the current time slot CT, excess packets are shifted to a trailing time slot with free space, whereas if there is free space in the current time slot CT, the next time slot is configured as the current time slot CT. Note that if there is no free space in the trailing time slot, the communication controller 2-8 may also search for another queue with free space in the current time slot CT, and shift excess packets to the current time slot CT of a found communication channel 6.

The structural elements of the communication management system 2 are not limited to the above. For example, the data volume per unit time flowing through each communication channel 6, or in other words, the actual bandwidth of each communication channel 6 changes from one moment to the next. Accordingly, the communication management system 2 is also configured to use the actual bandwidth of each communication channel 6 as feedback, so that the configuration value BW of the bandwidth on each communication channel 6 is adjusted according to the feedback results. This point is described below.

Figure 6:
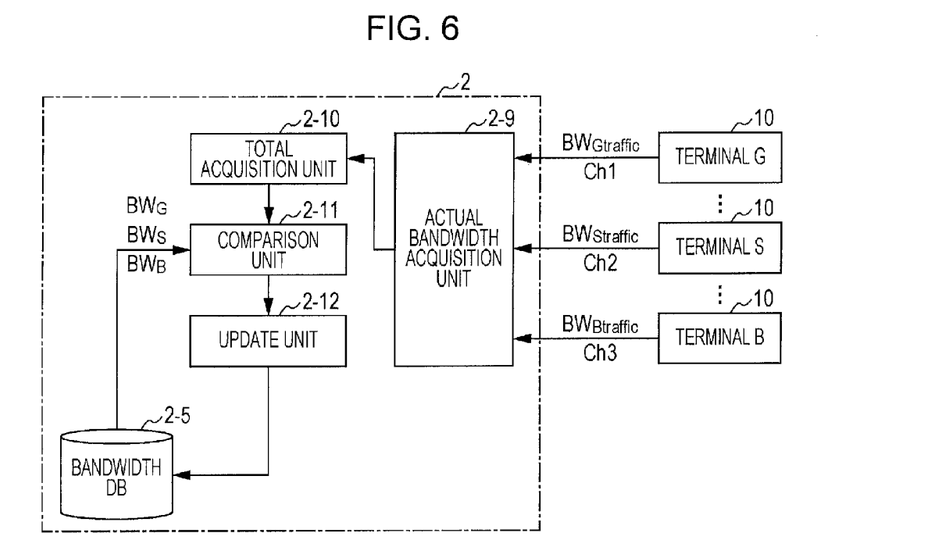
FIG. 6 is a diagram partially illustrating another subset of structural elements in a communication management system.

FIG. 6 is a diagram illustrating another subset of structural elements in the communication management system 2.

[Actual Bandwidth Acquisition Unit]

As illustrated in FIG. 6, the communication management system 2 is equipped with an actual bandwidth acquisition unit 2-9. The actual bandwidth acquisition unit 2-9 repeatedly acquires a measured value of the actual bandwidth on each communication channel 6, after the configuration value BW of the bandwidth is configured on each communication channel 6. In other words, the actual bandwidth acquisition unit 2-9 acquires a measured value $BW_{Gtraffic}$ of the actual bandwidth on the communication channel Ch1, a measured value $BW_{Straffic}$ of the actual bandwidth on the communication channel Ch2, and a measured value $BW_{Btraffic}$ of the actual bandwidth on the communication channel Ch3, at a predetermined time interval (for example, a 10 minute interval). The time interval for acquiring the measured value $BW_{Gtraffic}$, $BW_{Straffic}$, and $BW_{Btraffic}$ is shorter than the time interval for configuring the configuration values $BW_G$, $BW_S$, and $BW_B$.

Although there are many methods of acquiring the measured values, the actual bandwidth acquisition unit 2-9 may acquire the measured values as described below, for example.

Namely, at the above predetermined time interval, the actual bandwidth acquisition unit 2-9 selects, one at a time, a terminal 10 belonging to the gold-class client organization 8G (hereinafter designated the terminal G), a terminal 10 belonging to the silver-class client organization 8S (hereinafter designated the terminal S), and a terminal 10 belonging to the bronze-class client organization 8B (hereinafter designated the terminal B), and transmits an actual bandwidth measurement instruction to each of the selected terminals 10. Subsequently, the actual bandwidth acquisition unit 2-9 receives a measured value returned from the terminal G as the measured value $BW_{Gtraffic}$, receives a measured value returned from the terminal S as the measured value $BW_{Straffic}$, and receives a measured value returned from the terminal B as the measured value $BW_{Btraffic}$. Note that if a measured value is not returned from any of the terminal G, the terminal S, and the terminal B within a predetermined time since the transmission of the measurement instruction, the actual bandwidth acquisition unit 2-9 may reselect any of the terminal G, the terminal S, and the terminal B, and retransmit the measurement instruction to each of the reselected terminal G, terminal S, and terminal B.

Note that a terminal 10 receiving a measurement instruction measures the actual bandwidth as described below, for example. In other words, the terminal 10 receiving a measurement instruction transmits a dummy packet to the communication management system 2, and from the reception result of an acknowledgement returned in response, measures the packet loss ratio p and the round-trip time RTT. Subsequently, the packet loss ratio p, the round-trip time RTT, and a preset maximum segment size MSS are substituted into what is called a throughput equation, a measured value of the actual bandwidth is computed, and the computed measurement value is transmitted to the communication management system 2. The measured value computed by the terminal G corresponds to $BW_{Gtraffic}$, while the measured value computed by the terminal S corresponds to $BW_{Straffic}$, and the measured value computed by the terminal B corresponds to $BW_{Btraffic}$.

[Total Acquisition Unit]

Additionally, the communication management system 2 is equipped with a total acquisition unit 2-10. The total acquisition unit 2-10 repeatedly computes the total $BW_{traffic}$ of the measured values $BW_{Gtraffic}$, $BW_{Straffic}$, and $BW_{Btraffic}$ of the actual bandwidth on each communication channel 6. Specifically, the total acquisition unit 2-10 computes the total $BW_{traffic}$ every time the actual bandwidth acquisition unit 2-9 acquires the measured values $BW_{Gtraffic}$, $BW_{Straffic}$, and $BW_{Btraffic}$.

[Comparison Unit, Update Unit]

Additionally, the communication management system 2 is equipped with a comparison unit 2-11 and an update unit 2-12. Every time the total $BW_{traffic}$ is computed, the comparison unit 2-11 reads out the configuration values $BW_G$, $BW_S$, and $BW_B$ from the bandwidth DB 2-5, and compares the total $BW_{SUM}$ of the read-out configuration values ($BW_G+BW_S+BW_B$) to the total $BW_{traffic}$.

Also, every time the total $BW_{traffic}$ and the total $BW_{SUM}$ are compared, the update unit 2-12 updates at least one of $BW_G$, $BW_S$, and $BW_B$ on the basis of the comparison result. In the present exemplary embodiment, if the total $BW_{traffic}$ is smaller than the total $BW_{SUM}$, the update unit 2-12 lowers the value of at least one of $BW_G$, $BW_S$, and $BW_B$ so that the total $BW_{SUM}$ does not become less than or equal to $BW_{traffic}$.

For example, if the total $BW_{traffic}$ is smaller than the total $BW_{SUM}$, the update unit 2-12 computes a value δ that is one-third the difference Δ between the total $BW_{sum}$ and the total $BW_{traffic}$ (δ=Δ/3), and lowers the value of $BW_G$, $BW_S$, and $BW_B$ by δ.

As another example, if the total $BW_{traffic}$ is smaller than the total $BW_{SUM}$, the update unit 2-12 lowers each of $BW_G$, $BW_S$, and $BW_B$ by a value depending on the type of communication channel 6. For example, the update unit 2-12 computes a value δ1 that is one-sixth Δ (δ1=Δ/6), and lowers the value of $BW_G$ by δ1, lowers the value of $BW_S$ by the double of δ1, and lowers the value of $BW_B$ by the triple of δ1.

Herein, if the total $BW_{traffic}$ is smaller than the total $BW_{SUM}$, the update unit 2-12 lowers the value of at least one of $BW_G$, $BW_S$, and $BW_B$ according to a priority order of $BW_B$ ($BW_B<BW_S, BW_G$), $BW_S$ ($BW_S<BW_G$), and $BW_G$. In other words, the update unit 2-12 prioritizes lowering the configuration value $BW_B$ by Δ before lowering $BW_S$ and $BW_G$. However, if "$BW_B-Δ$" becomes less than or equal to the lower-bound value BW4, the update unit 2-12 prioritizes lowering the configuration value $BW_S$ by Δ before lowering $BW_G$. Note that if "$BW_S-Δ$" becomes less than or equal to the lower-bound value BW3, the update unit 2-12 lowers the final remaining configuration value $BW_G$ by Δ.

In this way, the update unit 2-12 repeatedly updates the value of at least one of the configuration values $BW_G$, $BW_S$, and $BW_B$ at the above predetermined time interval.

In this way, in the communication management system 2, the configuration value BW of the bandwidth on each communication channel 6 is continuously adjusted according to a measured value of the actual bandwidth on each communication channel 6. Thus, the configuration value BW of the bandwidth on each communication channel 6 is continuously optimized.

Note that an exemplary embodiment of the present invention is not limited to just the above exemplary embodiment.

For example, in the above, contracts for client organizations 8 are prepared by the MVNO, but contracts for individuals may also be prepared. For example, the contracts prepared as contracts for individuals may be a gold contract for users with a high usage frequency during the nighttime (hereinafter designated night users), a silver contract for night users, a bronze contract for night users, a gold contract for users with a high usage frequency during the daytime (hereinafter designated day users), a silver contract for day users, and a bronze contract for day users. In this case, one contract represents one "group", rather than one client organization 8 representing one "group". In addition, Ch1 is assigned to the groups corresponding to each of the night user gold contract and the day user gold contract, while Ch2 is assigned to the groups corresponding to each of the night user silver contract and the day user silver contract, and Ch3 is assigned to the groups corresponding to each of the night user bronze contract and the day user bronze contract.

For example, the communication management system 2 may also be realized by one server (hereinafter designated the communication management server) among the servers constituting the cloud service system 1. In this case, the transition data DB 2-1, the bandwidth DB 2-5, and the delivery DB 2-7 may be realized by a hard disk provided in the communication management server. In addition, the Ch1 queue 2-6G, the Ch2 queue 2-6S, and the Ch3 queue 2-6B may be realized by main memory provided in the communication management server. In addition, the feature acquisition unit 2-2, the determination unit 2-3, the configuration unit 2-4, the communication controller 2-8, the total acquisition unit 2-10, the comparison unit 2-11, and the update unit 2-12 may be realized by a microprocessor, provided in the communication management server, that executes a communication management program stored in the above main memory. In addition, the communication unit 2-6 may be realized by main memory that realizes the queues, a microprocessor that realizes the communication controller 2-8, and a network interface provided in the communication management server. Also, the actual bandwidth acquisition unit 2-9 may be realized by a network interface and a microprocessor. Note that the above communication management program may be stored in main memory by being read out from a computer-readable information storage medium such as a DVD (registered trademark)-ROM, or stored in main memory by being downloaded from a network.

As another example, in the foregoing, the actual bandwidth acquisition unit 2-9 obtained the measured values $BW_{Gtraffic}$, $BW_{Straffic}$, and $BW_{Btraffic}$ by "receiving" from the terminal G, the terminal S, and the terminal B, but the actual bandwidth acquisition unit 2-9 itself may also measure the measured values $BW_{Gtraffic}$, $BW_{Straffic}$, and $BW_{Btraffic}$. In this case, to measure the measured values $BW_{Gtraffic}$, $BW_{Straffic}$, and $BW_{Btraffic}$, the actual bandwidth acquisition unit 2-9 may transmit a dummy packet to the terminal G, the terminal S, and the terminal B at a predetermined time interval, and compute the measured values $BW_{Gtraffic}$, $BW_{Straffic}$, and $BW_{Btraffic}$ from the results of acknowledgements returned from each terminal 10.

As another example, in the foregoing, the update unit 2-12 updates the value of at least one of $BW_G$, $BW_S$, and $BW_B$ only when the total $BW_{traffic}$ smaller than the total $BW_{SUM}$, but the update unit 2-12 may also update the value of at least one of $BW_G$, $BW_S$, and $BW_B$ even when the total $BW_{traffic}$ is larger than the total $BW_{SUM}$. For example, when the total $BW_{traffic}$ is larger than the total $BW_{SUM}$, the update unit 2-12 may raise the value of at least one of $BW_G$, $BW_S$, and $BW_B$.

Specifically, if the total $BW_{traffic}$ is larger than the total $BW_{SUM}$, the update unit 2-12 computes a value δ that is one-third the difference Δ between the total $BW_{SUM}$ and the total $BW_{traffic}$ (δ=Δ/3), and raises the value of $BW_G$, $BW_S$, and $BW_B$ by δ. As another example, if the total $BW_{traffic}$ is larger than the total $BW_{SUM}$, the update unit 2-12 raises each of $BW_G$, $BW_S$, and $BW_B$ by a value depending on the type of communication channel 6. For example, the update unit 2-12 may compute a value δ1 that is one-sixth Δ (δ1=Δ/6), and raise the value of $BW_G$ by the triple of δ1, raise the value of $BW_S$ by the double of δ1, and raise the value of $BW_B$ by δ1. In this way, the values of $BW_G$, $BW_S$, and $BW_B$ are raised so that the total $BW_{traffic}$ becomes less than or equal to $BW_{SUM}$. In addition, when the total $BW_{traffic}$ is larger than the total $BW_{SUM}$, the update unit 2-12 may also revert each of $BW_G$, $BW_S$, and $BW_B$ to an initial value. Herein, the "initial value" refers to the value of each of $BW_G$, $BW_S$, and $BW_B$ configured by the configuration unit 2-4. In this case, the communication management system 2 may be additionally equipped with storage unit that stores initial values configured by the configuration unit 2-4, and when the total $BW_{traffic}$ is larger than the total $BW_{SUM}$, the update unit 2-12 may read out the initial values.

In addition, when the total $BW_{traffic}$ is larger than the total $BW_{SUM}$, the update unit 2-12 may raise the value of at least one of $BW_G$, $BW_S$, and $BW_B$ according to a priority order $BW_G$, $BW_S$, and $BW_B$. In other words, when the total $BW_{traffic}$ is larger than the total $BW_{SUM}$, the update unit 2-12 prioritizes raising the value of the configuration value $BW_G$ by the above Δ before raising $BW_S$ and $BW_B$. However, if "$BW_G+Δ$" exceeds the upper-bound value BW1, the update unit 2-12 prioritizes raising the configuration value $BW_S$ by Δ before raising $BW_B$. Note that if "$BW_S+Δ$" becomes less than or equal to the upper-bound value BW2, the update unit 2-12 raises the final remaining configuration value $BW_B$ by Δ.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication management system comprising:
    at least one hardware processor configured to implement:
        a communication unit that respectively communicates with an information terminal belonging to one of a plurality of groups, via a communication channel assigned to the group to which the information terminal belongs, from among a plurality of communication channels;
        a control unit that controls a communication via the communication channel on the basis of a configuration value of bandwidth on the communication channel;
    a feature acquisition unit that, for each of the plurality of groups to which each of the communication channels is assigned, acquires a plurality of feature vectors whose components are a time at which a communication traffic volume reaches a peak and a peak value of the communication traffic volume, and acquires a vector sum of the plurality of feature vectors acquired as features for the communication channel; and
        a bandwidth configuration unit that, for each communication channel, configures the configuration value of bandwidth on the communication channel, on the basis of whether or not the features acquired for the communication channel satisfy a condition unique to the communication channel.

2. The communication management system according to claim 1, wherein the at least one hardware processor is further configured to implement:
    an acquisition unit that, after the configuration value of bandwidth on each communication channel is configured, repeatedly acquires a total of measured values of actual bandwidth on each communication channel;
    comparison unit that, every time the total is acquired, compares the acquired total to a total of the configuration values of bandwidth on each communication channel; and
    an update unit that, on the basis of a comparison result of the comparison unit, updates the configuration value of bandwidth on at least one communication channel.

3. The communication management system according to claim 2, wherein
    when the total of the measured values of actual bandwidth on each communication channel is smaller than the total of the configuration values of bandwidth on each communication channel, the update unit lowers the configuration value of bandwidth on at least one communication channel.

4. The communication management system according to claim 3, wherein
    when the total of the measured values of actual bandwidth on each communication channel is smaller than the total of the configuration values of bandwidth on each communication channel, the update unit lowers the configuration value of bandwidth on at least one communication channel, so that the total of the measured values of actual bandwidth on each communication channel does not become less than or equal to the total of the configuration values of bandwidth on each communication channel.

5. The communication management system according to claim 3, wherein
    when the total of the measured values of actual bandwidth on each communication channel is smaller than the total of the configuration values of bandwidth on each communication channel, the update unit prioritizes lowering the configuration value of bandwidth on a communication channel before lowering the configuration value of bandwidth on a communication channel with a larger configuration value than the relevant communication channel.

6. The communication management system according to claim 1, wherein the configuration values comprise a first threshold, a second threshold and a third threshold each representing a different bandwidth allocated to ones of the communication channels,
    the first threshold is assigned to the communication channel,
    the second threshold is assigned to a second communication channel of the communication channels, and
    the third threshold is assigned to a third communication channel of the communication channels.

7. The communication management system according to claim 6, wherein in response to determining a difference between a sum of the configuration values and a sum of the used bandwidths, the bandwidth configuration unit further adjusts each of the first threshold, the second threshold and the third threshold by an equal amount totaling to the difference.

8. The communication management system according to claim 6, wherein in response to determining a difference between a sum of the configuration values and a sum of the used bandwidths, the bandwidth configuration unit further adjusts at least one of the first threshold, the second threshold and the third threshold by an amount totaling to the difference.

9. The communication management system according to claim 6, wherein in response to determining a difference between a sum of the configuration values and a sum of the used bandwidths, the bandwidth configuration unit further adjusts each of the first threshold, the second threshold and the third threshold by differing amounts totaling to the difference.

10. The communication management system according to claim 6, wherein in response to determining that a difference indicates that a sum of the configuration values is less than a sum of the used bandwidths by the difference:
    the bandwidth configuration unit lowers the first threshold by a first amount such that the first threshold is lowered at most to a first lower bound preset to the communication channel, in a case in which the first amount is less than the difference, the bandwidth configuration unit further lowers the second threshold by a second amount such that the second threshold is lowered at most to a second lower bound preset to the second communication channel, and in a case in which a sum of the first amount and the second amount is less than the difference, the bandwidth configuration unit further lowers the third threshold by a third amount such that the third threshold is lowered at most to a third lower bound preset to the third communication channel.

11. The communication management system according to claim 10, wherein the first lower bound is less than the second lower bound, and the second lower bound is less than the third lower bound.

12. The communication management system according to claim 11, wherein in response to determining that the difference indicates that a sum of the configuration values is greater than a sum of the used bandwidths by the difference:

the bandwidth configuration unit increases the third threshold by a fourth amount such that the fourth threshold is increased at most to a fourth upper bound preset to the third communication channel, in a case in which the fourth amount is less than the difference, the bandwidth configuration unit further increases the second threshold by a fifth amount such that the second threshold is increased at most to the third lower bound, and in a case in which a sum of the fourth amount and the fifth amount is less than the difference, the bandwidth configuration unit further increases the first threshold by a sixth amount such that the first threshold is increased at most to the second lower bound.

13. The communication management system according to claim 1, wherein the bandwidth configuration unit adjusts the configuration value of bandwidth on the communication channel in response to determining that a same of the configuration values differs from a sum of the used bandwidths on the communication channels.

14. A non-transitory computer readable medium storing a program configured to instruct at least one hardware processor to implement:

a communication unit that respectively communicates with an information terminal belonging to one of a plurality of groups, via a communication channel assigned to the group to which the information terminal belongs, from among a plurality of communication channels;

a control unit that controls a communication via the communication channel on the basis of a configuration value of bandwidth on the communication channel;

a feature acquisition unit that, for each of the plurality of groups to which each of the communication channels is assigned, acquires a plurality of feature vectors whose components are a time at which a communication traffic volume reaches a peak and a peak value of the communication traffic volume, and acquires a vector sum of the plurality of feature vectors acquired as features for the communication channel; and a bandwidth configuration unit that, for each communication channel, configures the configuration value of bandwidth on the communication channel, on the basis of whether or not the features acquired for the communication channel satisfy a condition unique to the communication channel.

* * * * *